US009239415B2

(12) United States Patent
Miao et al.

(10) Patent No.: US 9,239,415 B2
(45) Date of Patent: *Jan. 19, 2016

(54) NEAR-TO-EYE DISPLAY WITH AN INTEGRATED OUT-LOOKING CAMERA

(75) Inventors: Xiaoyu Miao, Sunnyvale, CA (US); Babak Amirparviz, Mountain View, CA (US); Adrian Wong, Austin, TX (US)

(73) Assignee: Google Inc., Mountain View, CA (US)

( * ) Notice: Subject to any disclaimer, the term of this patent is extended or adjusted under 35 U.S.C. 154(b) by 725 days.

This patent is subject to a terminal disclaimer.

(21) Appl. No.: 13/415,694

(22) Filed: Mar. 8, 2012

(65) Prior Publication Data

US 2013/0235191 A1     Sep. 12, 2013

(51) Int. Cl.
*G02B 5/30*     (2006.01)
*G02B 27/01*    (2006.01)

(52) U.S. Cl.
CPC .............. *G02B 5/30* (2013.01); *G02B 27/0172* (2013.01); *G02B 2027/0138* (2013.01)

(58) Field of Classification Search
CPC ................. G02B 5/30; G02B 27/0172; G02B 2027/0138
USPC ................................. 359/462; 345/7; 348/143
See application file for complete search history.

(56) References Cited

U.S. PATENT DOCUMENTS

| 4,711,512 A | 12/1987 | Upatnieks |
| 5,076,664 A | 12/1991 | Migozzi |
| 5,093,567 A | 3/1992 | Staveley |
| 5,539,422 A | 7/1996 | Heacock et al. |
| 5,687,025 A | 11/1997 | Nanba |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |
| 5,844,530 A | 12/1998 | Tosaki |

(Continued)

FOREIGN PATENT DOCUMENTS

| EP | 1 808 722 A2 | 7/2007 |
| GB | 2 272 980 A  | 6/1994 |

(Continued)

OTHER PUBLICATIONS

English translation of JP 2007-156096; machine translation performed by Google Translate, Mar. 28, 2013, 17 pages.

(Continued)

*Primary Examiner* — Helen Shibru
(74) *Attorney, Agent, or Firm* — Blakely Sokoloff Taylor & Zafman LLP

(57) ABSTRACT

Embodiments of a near-to-eye display include a light guide with a proximal end, a distal end, a front surface spaced apart from a back surface, an ambient input region on the front surface and an output region on the back surface. A display and a camera are positioned at or near the proximal end. A proximal optical element is positioned in the light guide and optically coupled to the display and the camera. A distal optical element is positioned in the light guide and optically coupled to the proximal optical element, the ambient input region and the output region. The proximal optical element can direct display light toward the distal optical element and ambient light to the camera, and the distal optical element can direct display light to the output region and ambient light to the output region and to the proximal optical element.

24 Claims, 6 Drawing Sheets

(56) References Cited

U.S. PATENT DOCUMENTS

| | | | |
|---|---|---|---|
| 5,886,822 A * | 3/1999 | Spitzer | ............................ 359/630 |
| 5,896,232 A | 4/1999 | Budd et al. | |
| 5,943,171 A | 8/1999 | Budd et al. | |
| 5,949,583 A | 9/1999 | Rallison et al. | |
| 6,023,372 A | 2/2000 | Spitzer et al. | |
| 6,043,591 A | 3/2000 | Gleckman | |
| 6,091,546 A | 7/2000 | Spitzer | |
| 6,172,657 B1 | 1/2001 | Kamakura et al. | |
| 6,201,629 B1 | 3/2001 | McClelland et al. | |
| 6,204,974 B1 | 3/2001 | Spitzer | |
| 6,222,677 B1 | 4/2001 | Budd et al. | |
| 6,335,838 B1 | 1/2002 | Kasai et al. | |
| 6,349,001 B1 | 2/2002 | Spitzer | |
| 6,353,492 B2 | 3/2002 | McClelland et al. | |
| 6,353,503 B1 | 3/2002 | Spitzer et al. | |
| 6,356,392 B1 | 3/2002 | Spitzer | |
| 6,384,982 B1 | 5/2002 | Spitzer | |
| 6,538,799 B2 | 3/2003 | McClelland et al. | |
| 6,618,099 B1 | 9/2003 | Spitzer | |
| 6,690,516 B2 | 2/2004 | Aritake et al. | |
| 6,693,749 B2 | 2/2004 | King et al. | |
| 6,701,038 B2 | 3/2004 | Rensing et al. | |
| 6,715,878 B1 | 4/2004 | Gobbi et al. | |
| 6,724,354 B1 | 4/2004 | Spitzer et al. | |
| 6,738,535 B2 | 5/2004 | Kanevsky et al. | |
| 6,747,611 B1 | 6/2004 | Budd et al. | |
| 6,829,095 B2 | 12/2004 | Amitai | |
| 6,879,443 B2 | 4/2005 | Spitzer et al. | |
| 6,880,931 B2 | 4/2005 | Moliton et al. | |
| 7,158,096 B1 | 1/2007 | Spitzer | |
| 7,242,527 B2 | 7/2007 | Spitzer et al. | |
| 7,391,573 B2 | 6/2008 | Amitai | |
| 7,457,040 B2 | 11/2008 | Amitai | |
| 7,576,916 B2 | 8/2009 | Amitai | |
| 7,577,326 B2 | 8/2009 | Amitai | |
| 7,643,214 B2 | 1/2010 | Amitai | |
| 7,663,805 B2 | 2/2010 | Zaloum et al. | |
| 7,672,055 B2 | 3/2010 | Amitai | |
| 7,724,441 B2 | 5/2010 | Amitai | |
| 7,724,442 B2 | 5/2010 | Amitai | |
| 7,724,443 B2 | 5/2010 | Amitai | |
| 7,843,403 B2 | 11/2010 | Spitzer | |
| 7,900,068 B2 | 3/2011 | Weststrate et al. | |
| 8,004,765 B2 | 8/2011 | Amitai | |
| 2001/0055152 A1 | 12/2001 | Richards | |
| 2003/0090439 A1 | 5/2003 | Spitzer et al. | |
| 2004/0174496 A1 | 9/2004 | Ji et al. | |
| 2005/0174651 A1 | 8/2005 | Spitzer et al. | |
| 2006/0192306 A1 | 8/2006 | Giller et al. | |
| 2006/0192307 A1 | 8/2006 | Giller et al. | |
| 2007/0217018 A1 | 9/2007 | Fredriksson | |
| 2008/0186604 A1 | 8/2008 | Amitai | |
| 2008/0219025 A1 | 9/2008 | Spitzer et al. | |
| 2008/0241537 A1 | 10/2008 | Sennett et al. | |
| 2009/0122414 A1 | 5/2009 | Amitai | |
| 2010/0046070 A1 | 2/2010 | Mukawa | |
| 2010/0079356 A1 | 4/2010 | Hoellwarth | |
| 2010/0103078 A1 | 4/2010 | Mukawa et al. | |
| 2010/0149073 A1 | 6/2010 | Chaum et al. | |
| 2010/0157433 A1 | 6/2010 | Mukawa et al. | |
| 2010/0202048 A1 | 8/2010 | Amitai et al. | |
| 2010/0278480 A1 | 11/2010 | Vasylyev | |
| 2011/0176179 A1 * | 7/2011 | Judelson | ........................ 358/448 |
| 2011/0213664 A1 | 9/2011 | Osterhout et al. | |
| 2012/0050141 A1 * | 3/2012 | Border et al. | ....................... 345/8 |
| 2012/0132806 A1 * | 5/2012 | Findlay | ................. G01J 1/0266 250/338.1 |
| 2012/0170284 A1 * | 7/2012 | Shedletsky | ........... G02F 1/13318 362/355 |
| 2012/0194493 A1 * | 8/2012 | Soto | ...................... G09G 3/3406 345/207 |
| 2012/0268262 A1 * | 10/2012 | Popovic | .................. B60Q 9/008 340/438 |
| 2013/0021658 A1 | 1/2013 | Miao et al. | |
| 2013/0044130 A1 | 2/2013 | Geisner et al. | |
| 2013/0108229 A1 * | 5/2013 | Starner et al. | .................. 385/119 |
| 2013/0128364 A1 | 5/2013 | Wheeler et al. | |
| 2013/0162505 A1 | 6/2013 | Crocco et al. | |
| 2013/0207887 A1 * | 8/2013 | Raffle et al. | ..................... 345/156 |
| 2014/0320755 A1 * | 10/2014 | Martinez et al. | ................. 349/11 |

FOREIGN PATENT DOCUMENTS

| | | |
|---|---|---|
| JP | 2003-230539 A | 8/2003 |
| JP | 2007-156096 | 6/2007 |
| WO | WO 96/05533 A1 | 2/1996 |
| WO | WO 2009-136393 | 11/2009 |
| WO | WO 2011/114092 A1 | 9/2011 |

OTHER PUBLICATIONS

PCT/US2013/027290; PCT International Preliminary Report on Patentability, mailed Sep. 18, 2014 (9 pages).

Levola, T., "Diffractive Optics for Virtual Reality Displays", Academic Dissertation, Joensuu 2005, University of Joensuu, Department of Physics, Vaisala Laboratory, 26 pages.

Mukawa, H. et al., "8.4: Distinguished Paper: A Full Color Eyewear Display using Holographic Planar Waveguides", SID Symposium Digest of Technical Papers, 2008, vol. 39, Issue 1, pp. 89-92.

PCT/US2013/027290—International Search Report and Written Opinion, mailed Jun. 26, 2013 (10 pages).

* cited by examiner

NEAR-TO-EYE DISPLAY WITH AN INTEGRATED OUT-LOOKING CAMERA

TECHNICAL FIELD

The described embodiments relate generally to heads-up displays and in particular, but not exclusively, to a heads-up display including an integrated out-looking camera.

BACKGROUND

Heads-up displays, also sometimes known as near-to-eye displays, allow a user to view a scene in front of them while relevant information is overlaid on the scene, so that the user looking through the heads-up display simultaneously sees both the scene and the relevant information. For example, a pilot looking through a heads-up display while landing an airplane simultaneously sees the airport ahead (the scene) through the heads-up display while the heads-up display projects information such as speed, heading and altitude (the relevant information) that the pilot needs to land the plane.

In some instances it can be useful to couple a heads-up display with a camera that can capture the scene being viewed by the user. A potential difficulty with coupling the heads-up display with a camera is that of ensuring that the scene captured by the camera is the same as the scene viewed by the user, and that the captured image is correctly registered with the viewed image.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an apparatus, system and method for a heads-up display including an integrated out-looking camera are described. Numerous specific details are described to provide a thorough understanding of embodiments of the invention, but one skilled in the relevant art will recognize that the invention can be practiced without one or more of the described details, or with other methods, components, materials, etc., that are not described. In some instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one described embodiment. Thus, appearances in this specification of the phrases "in one embodiment" or "in an embodiment" do not necessarily all refer to the same embodiment. Furthermore, the described features, structures, or characteristics may be combined in any suitable manner in one or more embodiments.

Figure 1:
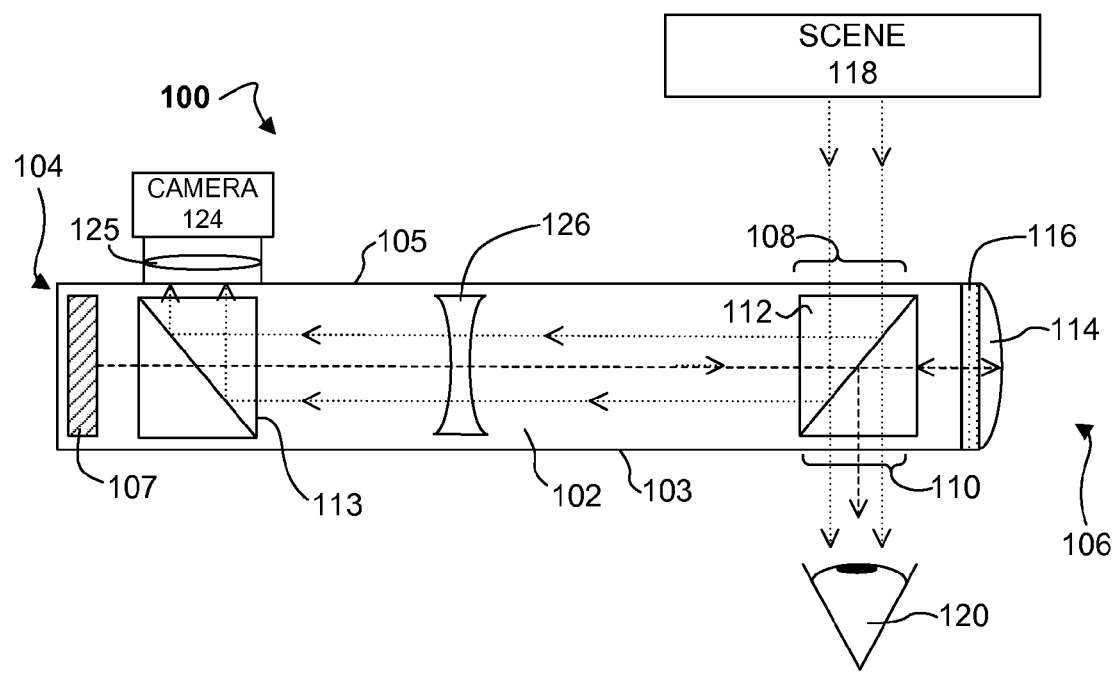
FIG. 1 is a cross-sectional view of an embodiment of a heads-up display.

FIG. 1 illustrates an embodiment of a heads-up display 100. Display 100 includes a light guide 102 having a back surface 103, a front surface 105, a proximal end 104 and a distal end 106. Light guide 102 can be made of any kind of material that is substantially transparent in the wavelengths of interest; in one embodiment, for example, light guide 102 can be made using plastic such as optical-grade acrylic or polycarbonate, but in other embodiments it could be made of a different material such as glass. A display 107 is positioned in or near proximal end 104. The display is optically coupled to light guide 102 so that display light from display 107 is input into light guide 102. In one embodiment, display 107 is a liquid-crystal-on-silicon (LCOS) display, but in other embodiments other kinds of displays can be used. Although not shown in the figure, other elements such as external light sources can be used together with display 107 such as when display 107 is a reflective LCOS display. Near distal end 106 are an ambient input region 108 positioned on front surface 105 to receive ambient light from a scene 118, and an output region 110 positioned on back surface 103 to output both display light and ambient light to one or both eyes 120 of a user.

A camera 124 is coupled to the front side 105 near distal end 104 to receive light directed to it through light guide 102. In the illustrated embodiment, camera 124 is coupled to light guide 102 by an optical element 125. In one embodiment optical element 125 is a refractive lens, but in other embodiments it can be a reflective or diffractive optical element, or some combination of refractive, diffractive and reflective optical elements. In still other embodiments, camera to 124 can be directly coupled to light guide 102 without any intervening optical elements such as optical element 125.

Positioned in light guide 102 at or near proximal end 104 is a proximal optical element 113 that operates to transmit light from display 107 through light guide 102 toward distal end 106. Proximal optical element 113 also operates to redirect light received through light guide 102 from distal end 106 toward camera 124 and, if present, optical element 125. In the illustrated embodiment proximal optical element 113 is a polarizing beam splitter (PBS), but in other embodiments optical element 113 can be some other element (see, e.g., FIGS. 2-3).

Positioned at or near distal end 106 is distal optical element 112. Also positioned at distal end 106 are optical elements 114 and 116. Distal optical element 112 and optical elements 114 and 116 work together to receive light from display 107 through light guide 102 and redirect the display light toward output region 110, so the display light is directed toward user eye 120. Distal optical element 112 simultaneously allows ambient light from scene 118 that enters light guide 102 through ambient input region to 108 to travel through the light guide and exit through output region 110 to a user's eye 120. In the illustrated embodiment of display 100, distal optical element 112 is a polarizing beamsplitter that is optically coupled to a focusing mirror 114 and to a quarter-wave plate 116 sandwiched between optical element 114 and the distal end of light guide 102. In other embodiments optical elements 112, 114 and 116 can be other types of optical elements provided that the individual elements and their combination accomplish the desired result.

In operation of heads-up display 100, polarized light generated by display 107 enters light guide 102 at or near proximal end 104 and travels through the light guide to polarizing beam splitter 113. Display light from display 107 is polarized, such that polarizing beam splitter 113 allows the display light to pass through and continue through light guide 102 toward distal end 106. As it travels through light guide 102, display light encounters optical element 126, if present. Optical element 126 can apply optical power to either focus or collimate the display light. After passing through optical element 126, the display light continues through light guide 102 toward distal end 106, where it encounters polarizing beamsplitter 112.

When the display light impinges on polarizing beamsplitter 112, the beamsplitter allows the polarized display light to travel directly through it. The display light that passes through beamsplitter 112 then travels through quarter-wave plate 116, which rotates the polarization by 45 degrees, and then encounters focusing mirror 114. Focusing mirror 114 reflects and/or focuses the polarized light, directing it back through quarter-wave plate 116. On it second trip through quarter-wave plate 116, the display light's polarization is rotated by a further 45 degrees, so that upon encountering polarizing beamsplitter 112 again the polarization of the display light has been rotated by a total of 90 degrees. As a result of this 90-degree change of polarization, when the display light encounters polarizing beamsplitter 112 a second time the beamsplitter reflects the display light toward output region 110 instead of allowing it to pass through. The display light then exits the light guide 102 and enters the user's eye 120.

Simultaneously with receiving display light from display 107, light guide 102 can receive ambient light from scene 118 through ambient input region 108. A portion of the ambient light that enters through ambient input region 108 will travel straight through polarizing beamsplitter 112 and exit the light guide through output region 110 to user's eye 120. That portion of the ambient light that is not allowed to pass directly through beam splitter 112 is instead reflected by beamsplitter 112 toward beam splitter 113. The portion of ambient light directed toward beam splitter 113 passes through optical element 126, if present, and because of its polarization is reflected by beam splitter 113 toward camera 124. Camera 124 can then use this received ambient light to capture an image of scene 118. Optical elements 125 and 126, if present, can be used to adjust characteristics of the image received at camera 124, for example its field of view and/or its optical power.

Using this arrangement to capture images with camera 124, the images see by user's eye 120 and camera 124 are formed by the same set of light rays from real world. In other words, camera 124 sees exactly what eye 120 sees, although in some embodiments the image captured by camera 124 is only a portion of what the eye 120 sees due to field of view limitations resulting from the thickness of light guide 102. Additionally, the center of the field of view where the virtual image is projected automatically aligns with the center of the field of view of real world see by the camera. By choosing the same field of view and resolution of the camera and display, the display realizes a 1:1 correspondence of each pixel between the image captured by the camera and the image projected by the display. As the camera see exactly what the eye sees, this configuration automatically addresses the registration problem which is considered to be a challenge in augmented-reality systems (see, e.g., FIG. 5).

Figure 2:
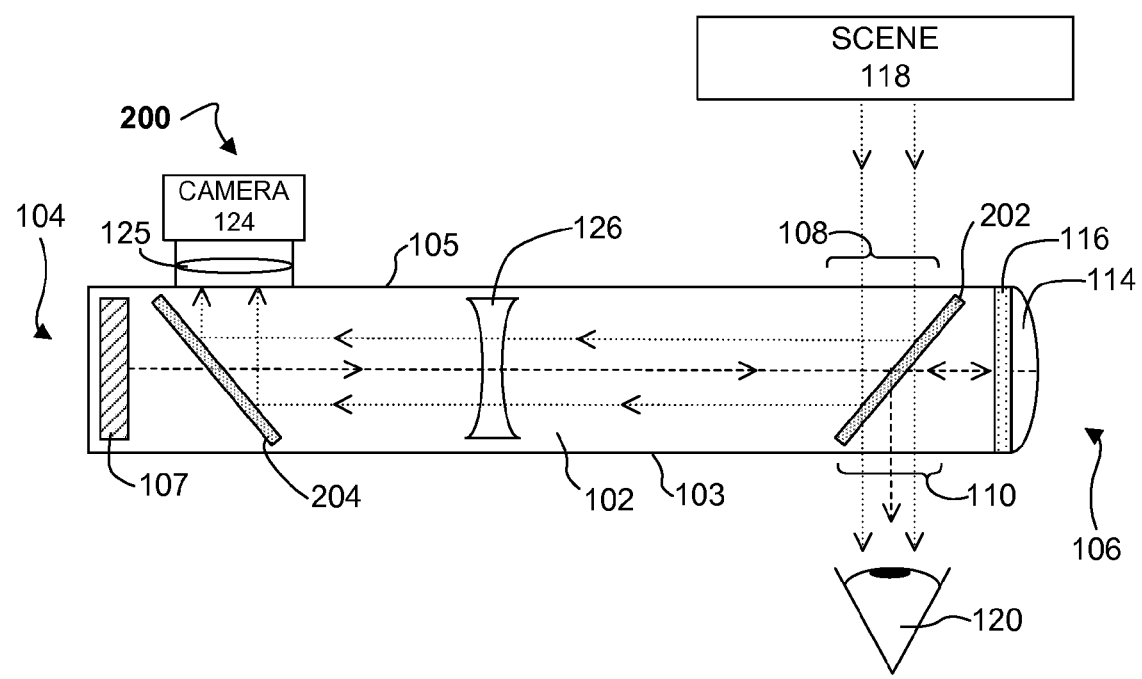
FIG. 2 is a cross-sectional view of another embodiment of a heads-up display.

FIG. 2 illustrates another embodiment of a heads-up display 200. Display 200 is similar in construction to display 100. The primary difference between displays 100 and 200 is that display 200 uses polarizing plates for proximal optical element 113 and distal optical element 112; in other words, display 200 replaces polarizing beam splitters 112 and 113 with polarizing plates. Display 200 operates similarly to display 100, the main advantage being the use of simpler optical elements and possible cost reductions.

Figure 3:
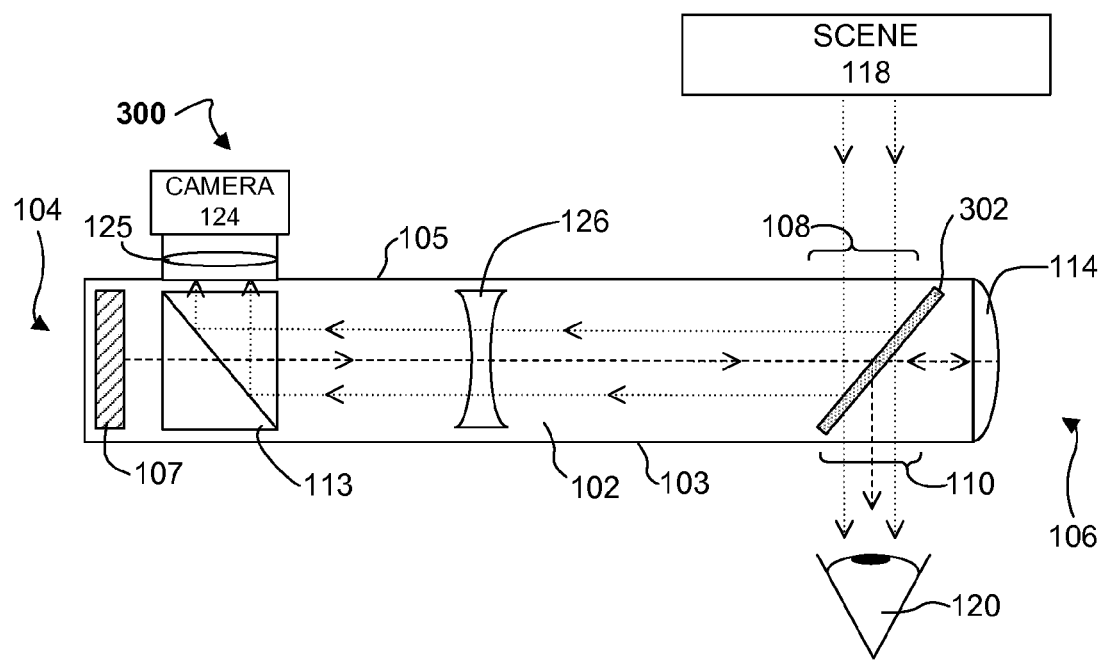
FIG. 3 is a cross-sectional view of another embodiment of a heads-up display.

FIG. 3 illustrates another embodiment of a heads-up display 300. Display 300 is similar in construction to display 100; the primary difference is that display 300 uses a partially-reflective mirror 302 as distal optical element 112 instead of a polarizing beam splitter. As a result of replacing polarizing beam splitter 112, display 300 can also omit quarter-wave plate 116. In one embodiment partially-reflective mirror 302 is 50% reflective, meaning that is reflects 50% of the incident light and allows the other 50% of the incident light to pass through. In other embodiments, however, these percentages can be different.

In operation of display 300, light generated by display 107 enters light guide 102 at or near proximal end 104 and travels through the light guide to polarizing beam splitter 113. Display light from display 107 is polarized, such that polarizing beam splitter 113 allows it to pass through and continue through light guide 102 toward distal end 106, where it encounters partially-reflective mirror 302. When display light impinges on the partially-reflective mirror, the mirror allows some fraction of the incident display light to travel through it. The display light that travels through partially-reflective mirror 302 then encounters focusing mirror 114, which reflects and/or focuses the light and directs it back toward the partially-reflective mirror. When the display light encounters partially-reflective mirror 302 a second time, the partially-reflective mirror allows part of the reflected display light through and reflects the rest of the display light toward output region 110. The display light then exits the light guide 102 and enters the user's eye 120.

Simultaneously with receiving light from display 120, partially-reflective mirror 302 can receive ambient light from scene 118 through ambient input region 108. Because partially-reflective mirror 302 is partially opaque, only a fraction of the display light and ambient light incident on partially-reflective mirror 302 end up exiting the light guide through output region 110 to the user's eye 120. For example, in an embodiment in which partially-reflective mirror 302 is a 50% (half-silvered) mirror, ambient light from the scene would be attenuated by 50% because it encounters the partially-reflective mirror only once, and the display light would be attenuated by 75% because it encounters partially-reflective mirror 302 twice. Similarly, in an embodiment in which partially-reflective mirror 302 is 90% transmissive and 10% reflective, 90% of the ambient light would exit through output region 110, but only 9% of the display light would exit through output region 110 to user's eye 120.

That portion of the ambient light that is not allowed to pass directly through partially-reflective mirror 302 is instead reflected by the partially-reflective mirror toward beam splitter 113. The portion of ambient light directed by the partially-reflective mirror toward beam splitter 113 passes through optical element 126, if present, and because of its polarization is reflected by beam splitter 113 toward camera 124. Camera 124 can then use this received ambient light to capture an image of scene 118. Optical elements 125 and 126, if present, can be used to adjust characteristics of the image received at camera 124, for example its field of view and/or its optical power.

Figure 4A:
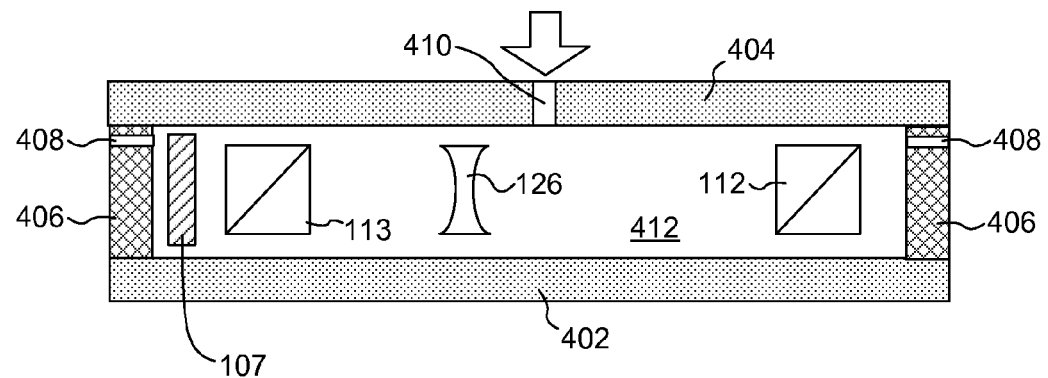
FIGS. 4A-4B are cross-sectional drawings of an embodiment of a process for making a heads-up display.
Figure 4B:
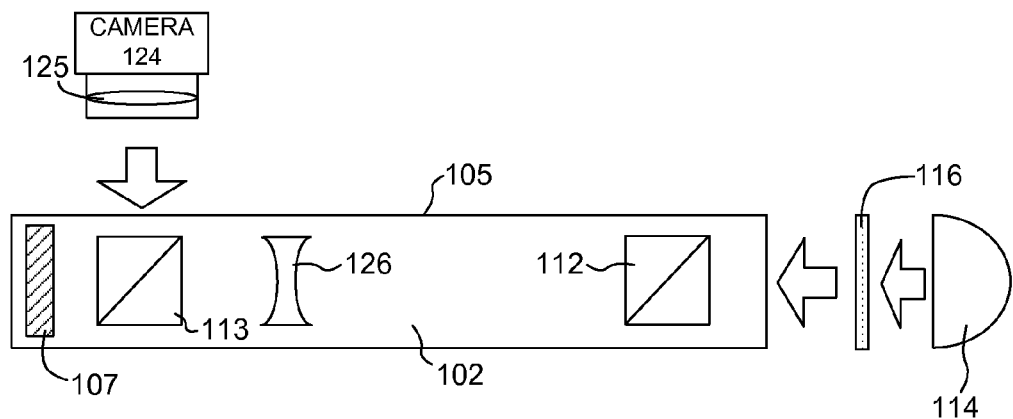

FIGS. 4A-4B illustrate an embodiment of a process for making heads-up display 100, but the illustrated process can also be used for making the other disclosed displays. FIG. 4A illustrates a first part of the process, in which a mold is formed using a lower plate 402 and an upper plate 404 separated by one or more spacers 406. The mold encloses a volume 412.

Upper plate 404 has a hole 410 therein to allow material to be injected into volume 412, while spacers 406 have vent holes 408 to allow gas to escape from volume 412 while material is injected through hole 410.

Optical elements that will be internal to the waveguide, such as display 107, polarizing beamsplitters 112 and 113, and additional optical element 126, if present, are properly positioned within volume 412 and fixed so that they do not move. A material is then injected through hole 410 into volume 412 so that it surrounds the internal optical elements, and the material is allowed to cure. When cured, the material will hold the optical elements in place. Any material that has the required optical characteristics can be used; in one embodiment, for example, the material can be an optically transparent plastic such as polycarbonate.

FIG. 4B illustrates a next part of the process. After the material is cured inside the mold, the mold can be removed leaving behind waveguide 102. Elements of the heads-up display that go on the exterior of the waveguide can then be added to complete the display. For example, camera 124 and, if present, optical element 125 can be attached to front side 105 of the waveguide, while quarter-wave plate 116 and optical element 114 can be attached to the distal end of waveguide 102 using optically compatible adhesives that will hold these components in place while causing little or no optical distortion. In an embodiment where display 107 is external to waveguide 102, display 107 can be optically coupled to the proximal end of the waveguide.

Figure 5:
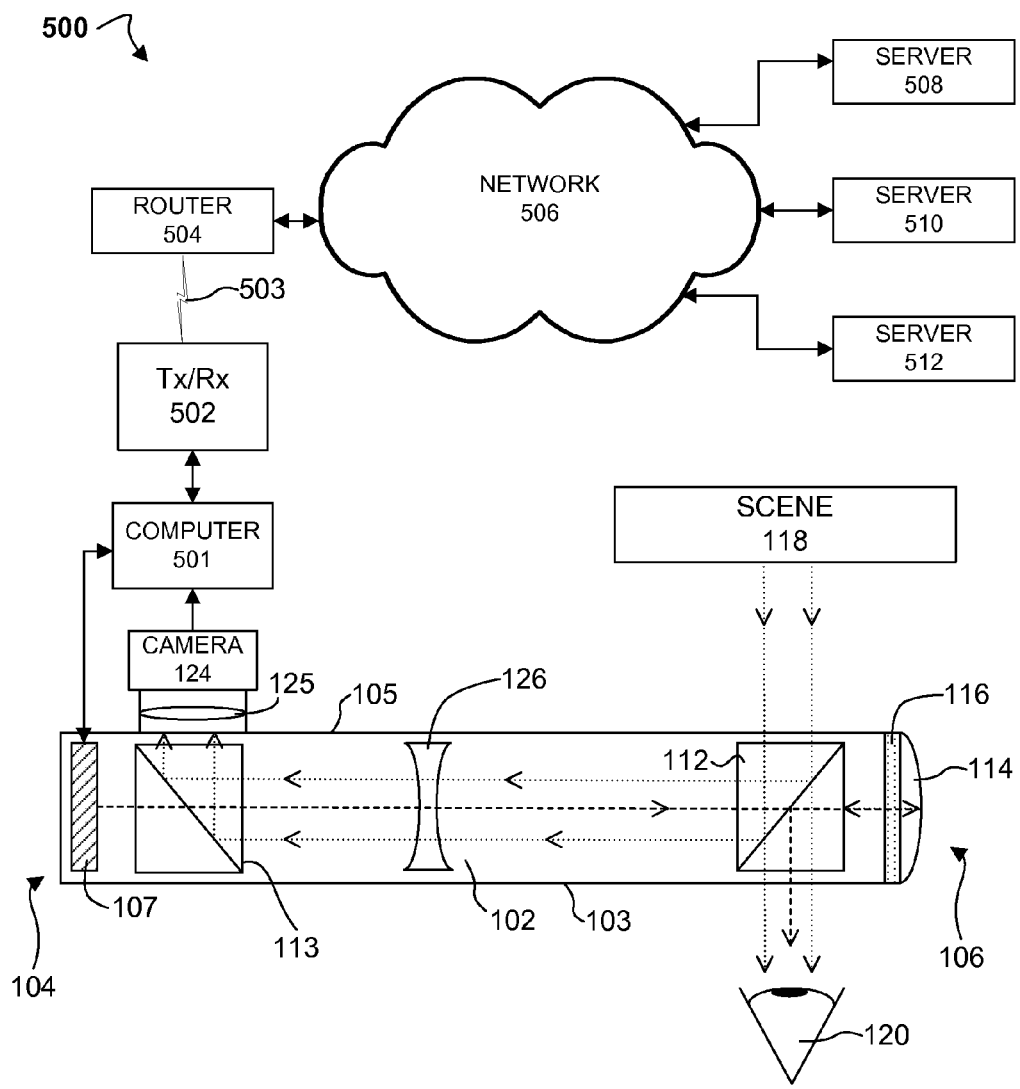
FIG. 5 is a block diagram of an embodiment of an augmented-reality system using a heads-up display.

FIG. 5 illustrates an embodiment of an augmented reality system 500 including a heads-up display. The illustrated system 500 employs display 100 as one of its components, but in other embodiments system 500 can employ any of the other disclosed displays. In system 500, camera 124 and display 107 are communicatively coupled via a computer 501 to a transceiver 502 that can both receive (Rx) and transmit (Tx) data. Computer 501 can include a general-purpose processor or an application-specific processor (ASIC), as well as memory, storage and any software or programming needed for its operation, such as an operating system, applications, databases and so forth. Computer 501 can also include additional hardware, such as a GPS unit that will provide the user's location.

Transceiver 502 is coupled via a communication link 503 to a communication element such as a router 504; in the illustrated embodiment transceiver 502 and router 503 are coupled via a wireless link, but in other embodiments they could be coupled by other types of communication link such as electrical wire, optical fiber, free-space optics, etc. Router 504 is in turn coupled via a network 506 to one or more servers such as servers 508-512, but in other embodiments router 504 could be directly coupled to one or more servers without the need for an intervening network.

In operation of system 500, display 100 functions as previously described; user's eye 120 simultaneously sees ambient light from scene 118 and display light from display 107. As the user sees ambient light from scene 118, camera 124 captures one or more images of scene 118 and transmits the image data, as well as any additional data such as the user's location, to computer 501. In one embodiment of system 500, all processing can be done locally by computer 501, while in another embodiment some or all the image processing, data retrieval, etc., can be done remotely by servers 508-512. In yet another embodiment, the data processing can be done by some combination of computer 501 and servers 508-512.

In an embodiment where all processing is done locally by computer 501, the computer need not have any access to external computers, so that all image analysis, data retrieval, etc. is done locally by computer 501. Such an embodiment could reduce latency and enhance system response by reducing the need for network communication with other components. When the image data from scene 118, as well as any additional data such as the user's location, is received at computer 501, the computer can perform various types of operations on the data, such as image recognition, feature extraction and/or recognition, etc. Based on the results of operations performed on the image data, computer 501 can fetch or otherwise obtain relevant information about the scene, for example from databases stored on the computer. Having fetched relevant information about the scene, computer 501 can send the relevant information back to display 107. Display 107 then displays the relevant information about the scene 118 to the user. Because display 100 is a heads-up display, the user's eye 120 sees the relevant information overlaid onto scene 118.

In an embodiment in which all processing is done remotely, or in an embodiment in which processing is done with a combination of local and remote processing, computer 501 can transmit all or parts of the image data to transceiver 502. Transceiver 502 in turn transmits the image data via communication link 503 to router 504, and the router in turn transmits the image data via network 506, if present, to one or more servers 508-512.

When the image data from scene 118 is received at servers 508-512, the servers can perform various types of operations on the data, such as image recognition, feature extraction and/or recognition, etc. Based on the results of operations performed on the image data, servers 508-512 can fetch or otherwise obtain relevant information about the scene. In one embodiment, for instance, if scene 118 has in it a specific building, an image including the building is transmitted to servers 508-512, which can then analyze the image to determine the identity of the building. After identifying the building, servers 508-512 can fetch relevant information about the building, such its name, address, list of building tenants, list of retail establishments in the building, etc. Having fetched relevant information about the scene, servers 508-512 send the relevant information back through network 506, router 504 and transceiver 502 to computer 501 and display 107. Display 107 then displays the relevant information about the scene 118 to the user. Because display 100 is a heads-up display, the user's eye 120 sees the relevant information overlaid onto scene 118.

Figure 6:
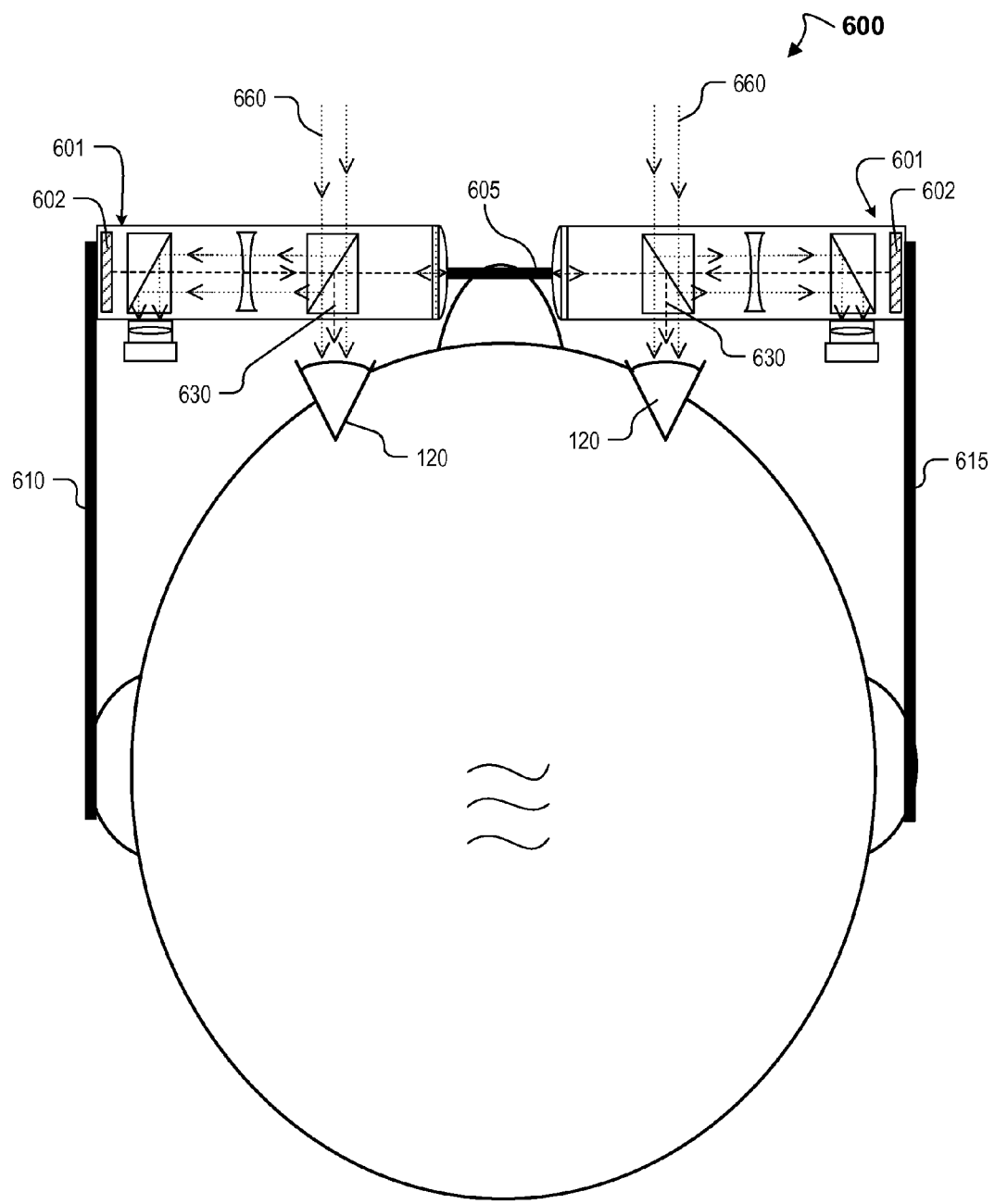
FIG. 6 is a top-view cross-sectional drawing of an embodiment of a heads-up display.

FIG. 6 illustrates an embodiment of a heads-up display 600 implemented as a pair of eyeglasses. Heads-up display 600 includes a pair of eyepieces 601, each of which can be one of heads-up displays 100, 200 or 300, or systems 500 or 600, in which the eyeglass lens functions as the light guide. Eyepieces 601 are mounted to a frame assembly, which includes a nose bridge 605, a left ear arm 610, and a right ear arm 615. Although the figure illustrates a binocular embodiment (two eyepieces), heads-up display 600 can also be implemented as a monocular (one eyepiece) embodiment.

Eyepieces 601 are secured into an eye glass arrangement that can be worn on a user's head. Left and right ear arms 610 and 615 rest over the user's ears, while nose assembly 605 rests over the user's nose. The frame assembly is shaped and sized to position a viewing region in front of a corresponding eye 120 of the user. Of course, other frame assemblies having other shapes may be used (e.g., a visor with ear arms and a nose bridge support, a single contiguous headset member, a headband, or goggles type eyewear, etc.). The viewing region of each eyepiece 601 allows the user to see an external scene via ambient light 660. Left and right display light 630 can be generated by displays 602 coupled to eyepieces 601, so that display light 630 is seen by the user as images superimposed over the external scene.

The above description of illustrated embodiments of the invention, including what is described in the abstract, is not intended to be exhaustive or to limit the invention to the precise forms described. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
a light guide including a proximal end, a distal end, a front surface and a back surface, the back surface being spaced apart and opposite from the front surface, an ambient input region on the front surface near the distal end and an output region on the back surface near the distal end;
a display positioned at or adjacent to the proximal end;
a camera positioned at or near the proximal end;
a proximal optical element positioned in the light guide and optically coupled to the display and to the camera, and a distal optical element positioned in the light guide and optically coupled to the proximal optical element, the ambient input region and the output region,
wherein the proximal optical element directs display light toward the distal optical element and directs ambient light reflected from the distal optical element to the camera, and
wherein the distal optical element directs the display light to the output region and allows a first portion of the ambient light received into the light guide through the ambient input region to pass to the output region and reflects a second portion of the ambient light to the proximal optical element.

2. The apparatus of claim 1 wherein the proximal optical element is a polarizing beam splitter.

3. The apparatus of claim 2, further comprising:
a focusing element positioned at the distal end of the light guide.

4. The apparatus of claim 1 wherein the proximal optical element is a polarizing beamsplitter and the distal optical element is a partially reflective mirror.

5. The apparatus of claim 1 wherein the proximal optical element and the distal optical elements are polarization plates.

6. The apparatus of claim 1 wherein the camera is mounted to the front surface.

7. The apparatus of claim 1, further comprising one or more additional optical elements positioned in the light guide between the proximal optical element and the distal optical element.

8. A system comprising:
one or more near-to-eye displays, each comprising:
a light guide including a proximal end, a distal end, a front surface and a back surface, the back surface being spaced apart and opposite from the front surface, an ambient input region on the front surface near the distal end and an output region on the back surface near the distal end;
a display positioned at or adjacent to the proximal end;
a camera positioned at or near the proximal end;
a proximal optical element positioned in the light guide and optically coupled to the display and to the camera, and a distal optical element positioned in the light guide and optically coupled to the proximal optical element, the ambient input region and the output region,
wherein the proximal optical element directs display light toward the distal optical element and directs ambient light reflected from the distal optical element to the camera, and
wherein the distal optical element directs the display light to the output region and allows a first portion of the ambient light received into the light guide through the ambient input region to pass to the output region and reflects a second portion of the ambient light to the proximal optical element; and
a computer coupled to the camera and the display.

9. The system of claim 8 wherein the proximal optical element is a polarizing beam splitter.

10. The system of claim 9, further comprising:
a focusing element positioned at the distal end of the light guide.

11. The system of claim 8 wherein the proximal optical element is a polarizing beamsplitter and the distal optical element is a partially reflective mirror.

12. The system of claim 8 wherein the proximal optical element and the distal optical elements are polarization plates.

13. The system of claim 8 wherein the camera is mounted to the front surface.

14. The system of claim 8, further comprising one or more additional optical elements positioned in the light guide between the proximal optical element and the distal optical element.

15. The system of claim 8 wherein the computer is capable of locally analyzing images received from the camera.

16. The system of claim 8, further comprising a transceiver coupled to the computer.

17. The system of claim 16, further comprising a network communicatively coupled to the transceiver.

18. The system of claim 17, further comprising one or more servers coupled to the network.

19. The system of claim 18 wherein the one or more servers is capable of analyzing images received from the camera and is capable of transmitting information about the image to the computer via the network.

20. The system of claim 8 wherein the one or more near-to-eye displays comprise a pair of near-to-eye displays mounted in eyeglass frames.

21. A process comprising:
directing display light to an output region of a near-to-eye display comprising:
a light guide including a proximal end, a distal end, a front surface and a back surface, the back surface being spaced apart and opposite from the front surface, an ambient input region on the front surface near the distal end and the output region on the back surface near the distal end,
a display positioned at or adjacent to the proximal end,
a camera positioned at or near the proximal end,
a proximal optical element positioned in the light guide and optically coupled to the display and to the camera, and a distal optical element positioned in the light guide and optically coupled to the proximal optical element, the ambient input region and the output region, wherein the proximal optical element directs display light toward the distal optical element and directs ambient light reflected from the distal optical element to the camera, and wherein the distal optical element directs the display light to the output region and allows a first portion of the ambient light received into the light guide through the ambient input region to pass to the output region and reflects a second portion of the ambient light to the proximal optical element;

directing ambient light from a scene into the ambient input region; and capturing an image of at least a portion of the scene using the camera.

22. The process of claim 21, further comprising directing display light from the display into the light guide.

23. The process of claim 21, further comprising analyzing the image.

24. The process of claim 23, further comprising obtaining information about the image and displaying the information in the display.

* * * * *